United States Patent
Zhu et al.

(10) Patent No.: US 7,941,004 B2
(45) Date of Patent: May 10, 2011

(54) SUPER RESOLUTION USING GAUSSIAN REGRESSION

(75) Inventors: Shenghuo Zhu, Santa Clara, CA (US); Mei Han, Cupertino, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 621 days.

(21) Appl. No.: 12/112,010

(22) Filed: Apr. 30, 2008

(65) Prior Publication Data
US 2009/0274385 A1 Nov. 5, 2009

(51) Int. Cl.
G06K 9/32 (2006.01)
G09G 5/00 (2006.01)
(52) U.S. Cl. .......... 382/299; 345/694; 345/3.3; 382/284
(58) Field of Classification Search .................. 382/276, 382/277, 284, 298–300; 345/694–699, 3.3–3.4
See application file for complete search history.

(56) References Cited

U.S. PATENT DOCUMENTS

| | | | | |
|---|---|---|---|---|
| 4,797,942 A * | 1/1989 | Burt | ............................. | 382/284 |
| 5,325,449 A * | 6/1994 | Burt et al. | ..................... | 382/240 |
| 5,488,674 A * | 1/1996 | Burt et al. | ..................... | 382/284 |
| 5,649,032 A * | 7/1997 | Burt et al. | ..................... | 382/284 |
| 5,657,402 A * | 8/1997 | Bender et al. | ................. | 382/284 |
| 5,696,848 A * | 12/1997 | Patti et al. | ..................... | 382/254 |
| 5,920,657 A * | 7/1999 | Bender et al. | ................. | 382/284 |
| 5,991,444 A * | 11/1999 | Burt et al. | ..................... | 382/232 |
| 5,999,662 A * | 12/1999 | Burt et al. | ..................... | 382/284 |
| 6,058,248 A * | 5/2000 | Atkins et al. | ................... | 358/1.2 |
| 6,075,926 A * | 6/2000 | Atkins et al. | ................... | 358/1.2 |
| 6,285,804 B1 * | 9/2001 | Crinon et al. | ................. | 382/299 |
| 6,404,516 B1 * | 6/2002 | Edgar | .......................... | 358/487 |
| 6,459,808 B1 * | 10/2002 | Brand | ........................... | 382/155 |
| 6,717,622 B2 * | 4/2004 | Lan | ................................ | 348/625 |
| 7,003,177 B1 * | 2/2006 | Mendlovic et al. | ........... | 382/299 |
| 7,006,712 B1 * | 2/2006 | Silver et al. | .................... | 382/300 |
| 7,106,914 B2 * | 9/2006 | Tipping et al. | ................ | 382/299 |
| 7,162,098 B1 * | 1/2007 | Dugan et al. | ................... | 382/251 |
| 7,218,796 B2 * | 5/2007 | Bishop et al. | ................. | 382/299 |
| 7,379,611 B2 * | 5/2008 | Sun et al. | ....................... | 382/254 |
| 7,379,612 B2 * | 5/2008 | Milanfar et al. | .............. | 382/254 |
| 7,447,382 B2 * | 11/2008 | Nestares et al. | .............. | 382/299 |
| 7,471,851 B2 * | 12/2008 | Strelow | .......................... | 382/299 |
| 7,477,802 B2 * | 1/2009 | Milanfar et al. | .............. | 382/299 |
| 7,523,078 B2 * | 4/2009 | Peot et al. | ........................ | 706/12 |
| 7,526,123 B2 * | 4/2009 | Moon et al. | .................... | 382/159 |
| 7,613,363 B2 * | 11/2009 | Platt et al. | ...................... | 382/299 |
| 7,715,658 B2 * | 5/2010 | Cho et al. | ....................... | 382/299 |
| 7,742,660 B2 * | 6/2010 | Keshet | ............................ | 382/298 |
| 7,778,439 B2 * | 8/2010 | Kondo et al. | ................... | 382/100 |
| 7,809,155 B2 * | 10/2010 | Nestares et al. | .............. | 382/100 |
| 7,840,095 B2 * | 11/2010 | Yamada | .......................... | 382/299 |
| 7,881,511 B2 * | 2/2011 | Ye et al. | ......................... | 382/128 |
| 7,889,950 B2 * | 2/2011 | Milanfar et al. | .............. | 382/300 |
| 2004/0170340 A1 * | 9/2004 | Tipping et al. | ................. | 382/299 |

(Continued)

*Primary Examiner* — Manav Seth
(74) *Attorney, Agent, or Firm* — Jeffery Brosemer; Joseph Kolodka (57) ABSTRACT

A computer implemented technique for producing super resolution images from ordinary images or videos containing a number of images wherein a number of non-smooth low resolution patches comprising an image are found using edge detection methodologies. The low resolution patches are then transformed using selected basis of a Radial Basis Function (RBF) and Gaussian process regression is used to generate high resolution patches using a trained model. The high resolution patches are then combined into a high resolution image or video.

5 Claims, 7 Drawing Sheets

U.S. PATENT DOCUMENTS

| | | | |
|---|---|---|---|
| 2004/0218834 A1* | 11/2004 | Bishop et al. | 382/299 |
| 2006/0159367 A1* | 7/2006 | Zeineh et al. | 382/276 |
| 2006/0291751 A1* | 12/2006 | Milanfar et al. | 382/299 |
| 2007/0041663 A1* | 2/2007 | Cho et al. | 382/299 |
| 2007/0041664 A1* | 2/2007 | Yamada | 382/299 |
| 2007/0071362 A1* | 3/2007 | Milanfar et al. | 382/299 |

* cited by examiner

SUPER RESOLUTION USING GAUSSIAN REGRESSION

FIELD OF THE INVENTION

This invention relates generally to the field of image processing and in particular to a computer implemented method for converting a low resolution image into a high(er) resolution image using sparse approximate Gaussian process regression.

BACKGROUND OF THE INVENTION

Super-resolution is a technique used to convert a low resolution image into a higher resolution image. Applications of super-resolution include, for example, improving low resolution images/videos produced from devices such as cell phone cameras or webcams as well as converting normal quality video programs (i.e., NTSC) into higher quality (i.e., HDTV) programs.

Contemporary approaches to image super-resolution may be broadly divided into three categories namely: 1) functional interpolation; 2) reconstruction-based; and 3) learning-based.

Functional interpolation approaches apply an existing function to an image thereby obtaining a processed image. Functional interpretation approaches often blur discontinuities and do not satisfy reconstruction constraint(s). Reconstruction-based approaches generate a high resolution image from a low resolution image sequence. The generated image—while generally meeting reconstruction constraints—does not guarantee contour smoothness. Finally, learning-based approaches use high frequency details from training images to improve a low resolution image.

In a paper entitled "Video Super-Resolution Using Personalized Dictionary", which appeared in Technical Report, 2005-L163, NEC Laboratories America, Inc., 2005, the authors M. Han, H. Tao, and Y. Gong described a learning-based super-resolution method namely an image hallucination approach consisting of three steps. In step 1, a low frequency image $I_H^l$ is interpolated from a low resolution image $I_L$. In step 2, a high frequency primitive layer $I_H^p$ is hallucinated or inferred from $I_H^l$ based on primal sketch priors. In step 3, reconstruction constraints are enforced thereby producing a final high resolution image $I_H$ According to the method disclosed, for any low resolution test image $I_L$, a low frequency image $I_H^l$ is interpolated from $I_L$ at first. It is assumed that the primitive layer $I_H^p$ to be inferred is a linear sum of a number of N high frequency primitives $\{B_n^h, n=1, \ldots, N\}$. The underlying low frequency primitives are $\{B_n^l, n=1, \ldots, N\}$ in the $I_H^l$. Note that the center of each image patch is on the contours extracted in $I_H^l$ and the neighboring patches are overlapped.

A straightforward nearest neighbor algorithm is used for this task. For each low frequency primitive $B_n^l$, its normalized $\hat{B}_n^l$ is obtained, then the best matched normalized low frequency primitive to $\hat{B}_n^l$ in the training data is found and pasted to the corresponding high frequency primitive.

This method tends to encounter two undesirable issues. First, this approach is—in essence—a one-nearest-neighbor (1-NN) approach, which likely leads to an over-fit. When a similar primitive patch pair exists in the training data, the approach generates a very good result. Otherwise, the approach often generates a lot of artifacts.

Second, this method is not scalable. Though an AAN tree algorithm theoretically takes $O(\log(n))$ time to find a best match, it unfortunately takes $O(n)$ space. Cache size of modern computing machines is insignificant as compared to the size of an entire training data set. Consequently, video super resolution employing this method does not run satisfactorily in on-line environments.

SUMMARY OF THE INVENTION

An advance is made in the art according to the principles of the present invention directed to a computer implemented method of producing a super-resolution image from a lower resolution image. In sharp contrast to prior-art methods that employed nearest neighbor methodologies, the present invention advantageously utilizes a Gaussian regression methodology thereby eliminating two noted problems associated with the prior art namely artifacts and lack of scalability.

According to an aspect of the invention, a number of non-smooth low resolution patches comprising an image are found using edge detection methodologies. The low resolution patches are then transformed using selected basis of a Radial Basis Function (RBF) and Gaussian process regression is used to generate high resolution patches using a trained model. The high resolution patches are then combined into a high resolution image or video.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, the diagrams herein represent conceptual views of illustrative structures embodying the principles of the invention.

Advantageously, the method of the present invention employs a regression approach instead of nearest neighbor to overcome the above mentioned issues.

Linear Regression

Instead of searching for $\Phi(B_i^h, B_i^l)$, we can approximate $Pr(B_i^h|B_i^l)$ with a Gaussian distribution, $N(f(B_i^l),\Sigma(B_i^l))$ To simplify the notation, we only use one component of f. For the other component, they use the same formula.

Let x be the column vector of a $B_i^l$, y be the one component of $B_i^h$. If we assume $f(x)=w^T x$ is a linear function, $$y = f(x) + \epsilon = w^T x + \epsilon, \qquad (1)$$

where w is a parameter vector, and $\epsilon$ is iid noise, having distribution of $N(\epsilon|0,\sigma^2)$.

We can add a constant component in vector x, if the bias is considered. We could then use the maximum likelihood principle to find the solution to the problem.

$$\hat{w} = \underset{w}{\operatorname{argmin}} \sum_i \frac{1}{2\sigma^2} \|y_i - w^T x_i\|^2 \qquad (2)$$

$$= \underset{w}{\operatorname{argmin}} \frac{1}{2\sigma^2} \|y^T - w^T X\|^2$$

$$= (XX^T)^{-1} X y,$$

where X is the matrix consisting of all column vector x, y is the vector consisting of corresponding y.

Those skilled in the art will readily appreciate that linear regression is not robust in some cases. To avoid over-fitting, we assume that the prior distribution, Pr(w), is a Gaussian, $N(w|0,I_d)$, where d is the dimensionality of the feature space. Then the posterior distribution, Pr(w|X,y), is also a Gaussian, $N(w|\mu_w, \Sigma_w)$ where $$\mu_w = (XX^T + \sigma^2 I_d)^{-1} X y, \qquad (3)$$

$$\Sigma_w = \left(\frac{1}{\sigma^2} XX^T + I_d\right)^{-1}.$$

Therefore, the posterior distribution, Pr(y|x,X,y), is $N(\mu_y, \Sigma_y)$, where $$\mu_y = \mu_w^T x,$$

$$\Sigma_y = x^T \Sigma_w x + \sigma^2. \qquad (4)$$

The linear model can be implemented very efficient. At running time, only a matrix-vector multiplication (matrix-matrix multiplication in batch) is needed. However, the dimensionality of patches limits the capacity of learning, which means that even sufficient training patch peers are provided this method can not store enough patterns.

Gaussian Process Regression

Advantageously, to increase the learning capacity of the method, according to the present invention we employ Gaussian Processes Regression.

Let $f(x)$ is a Gaussian process having $cov(f(x), f(x'))=k(x, x')$, where $k(x, x')$ is a kernel function. Commonly used kernel functions include Radial Basis Function (RBF), where $$k(x, x') = \exp\left(-\frac{\|x - x'\|^2}{2\sigma^2}\right)$$

Intuitively, we can treat $f(x)$ as a random variable, $\{f(x_i)\}$ as a multivariate random variable, exception that Gaussian process $f$ is an infinite dimensional one.

We use matrix X to represent N data points $\{x_i\}$, where each column of X is a data point. Let $f(X)$ be the vector of random variables $\{f(x_i)\}$. We have $cov(f(X))=K$, where K is the N×N Gram matrix of k and $K_{ij}=k(x_i,x_j)$. We define $\alpha$ as a N dimension random vector such that i $$f(X) = \alpha^T K \qquad (5)$$

Then $Pr(\alpha|X)$ follows Gaussian distribution, $N(\alpha|0,K^{-1})$

The posterior distribution of $Pr(\alpha|X,y)$ is also a Gaussian, $N(\mu_\alpha, \Sigma_\alpha)$, where $$\mu_\alpha = (K + \sigma^2 I)^{-1} y \qquad (6)$$

$$\Sigma_\alpha = \left(K + \frac{1}{\sigma^2} KK^T\right)^{-1}.$$

Therefore, the distribution Pr(y|x,X,y) is $N(\mu_y, \Sigma_y)$, where $$\mu_y = y(K+\sigma^2 I)^{-1} k(X,x),$$

$$\Sigma_y = k(x,x) - k(X,x)^T (K+\sigma^2 I)^{-1} k(X,x) + \sigma^2. \qquad (7)$$

Sparse Approximate Gaussian Process Regression

When N is large, it is time consuming to compute k(X,x). Therefore, we use Sparse Approximate Gaussian Process Regression. In Sparse Approximate Gaussian Process Regression approaches, we are training to training $f(x)$ using a small number, M, of bases. Similar to Eq. 5, we let $f(X_M)=\alpha^T K_{MM}$. Then $Pr(\alpha|X)$ is Gaussian, $N(\alpha|0,K_{MM}^{-1})$.

Then, the posterior distribution of $Pr(\alpha|X,y)$ is $N(\mu_\alpha, \Sigma_\alpha)$, where $$\mu_\alpha = (\sigma^2 K_{MM} + K_{MN} K_{MN}^T)^{-1} K_{MN} y, \qquad (8)$$

$$\Sigma_\alpha = \left(K_{MM} + \frac{1}{\sigma^2} K_{MN} K_{MN}^T\right)^{-1}.$$

We use M latent variable of $f(X_M)$ to infer the posterior distribution of $f(x)$. Therefore, the distribution $Pr(y|x,\mu_\alpha,\Sigma_\alpha)$ is $N(\mu_y,\Sigma_y)$, where $$\mu_y = \mu_\alpha^T k(X_M, x), \qquad (9)$$

$$\Sigma_y = k(x, x) - k(X, x)^T (K_{MM}^{-1} - \Sigma_\alpha) k(X, x) + \sigma^2.$$

Note that $$K_{MM}^{-1} - \Sigma_\alpha = \frac{1}{\sigma^2} K_{MN} K_{MN}^T \Sigma_\alpha.$$

When M=N, the sparse result is identical to the ordinary Gaussian Process Regression.

Implementation—Training Phase

The selecting optimal bases is an NP problem. We can use any of a number of methods to select bases in a greedy way. Actually, a random selection of bases works well enough. To estimate the model of α as Eq. 8, we need to compute $K_{MM}$ and $K_{MN}$. Since we can select M to meet the limitation of memory and CPU time, computing $K_{MM}$ is not difficult. However, the number of training data, N, could be large, therefore storing $K_{MN}$ could be a problem. Instead of computing $K_{MN}$, we efficiently update $K_{MN}K_{MN}^T$ and $K_{MN}y$ using rank-one update for each training example, or rank-k update for each batch of examples.

Implementation—Predicting Phase

The computation during the predicting phase includes kernel computation for k(x,X), and regression computation for $\mu_y$ and $\Sigma_y$. The operation during kernel computation depends on the type of the selected kernel. For RBF kernel, the main computation cost is exponential operation. The operation during regression computation is mainly the matrix-vector multiplication. We can replace a batch of matrix-vector multiplication with matrix-matrix multiplication, which usually speeds up the computation at the cost of memory.

In computing $f(x)$, the variance computation is relatively time-consuming, especially when M is greater than 2000. However, in our current approach, we don't need precise value of $f(x)$. To speedup the calculation, we can use low rank matrices to approximate $K_{MM}^{-1} - \Sigma_\alpha$ by $C^T DC$, where C is L×M matrix (L<M). The variance is computed as $\|D^{1/2}Ck(X_m,x)\|^2$.

In predicting phase, the memory is mainly used for holding the model (selected bases and regression matrices) and the batch data. The size of the model depends on the number of bases we selected. For the 256 bases, the size is about 500 KB to 2 MB. When we set the batch size to 1024, the memory used is about 10 MB.

With these principles in place, we may now examine the overall steps in producing a super resolution image according to the present invention. With initial reference to FIG. 1, there is shown a flow chart depicting the overall method. More particularly, an image—which may advantageously be a still image or one or more frames of a video set of images, is input (step 101). A number of non-smooth low resolution patches comprising the image are found using edge detection methodologies step 102).

Figure 1:
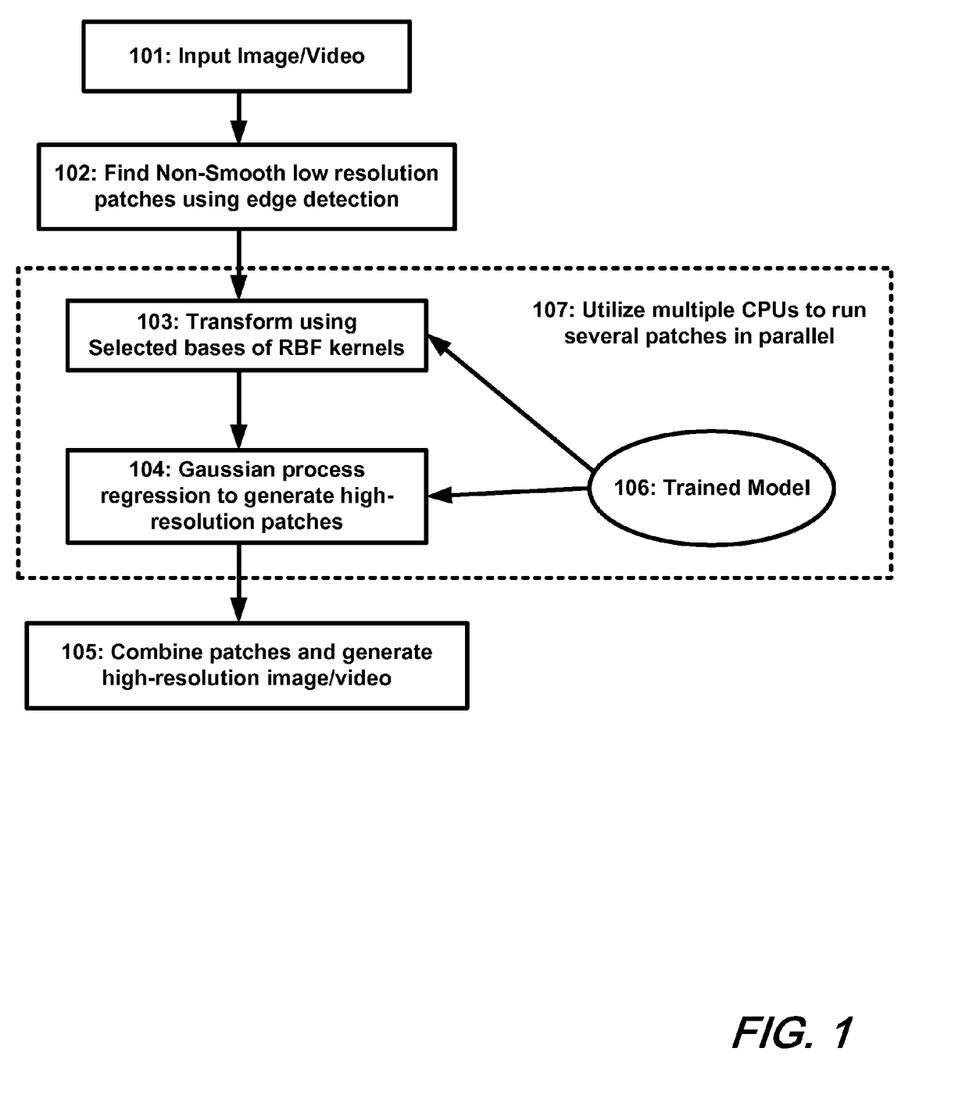
FIG. 1 is a flowchart showing the steps associated with producing a super resolution image according to the present invention.

The low resolution patches are then transformed using selected basis of a Radial Basis Function (RBF) (step 103). A gaussian process regression is used to generate high resolution patches (step 104) using a trained model (step 106). As can be readily appreciated by those skilled in the art, our inventive method may be advantageously performed using multiple CPUs on a parallel system to process a number of patches in parallel (step 107) Finally, the high resolution patches are combined into a high resolution image or video (sep 108).

Figure 2:
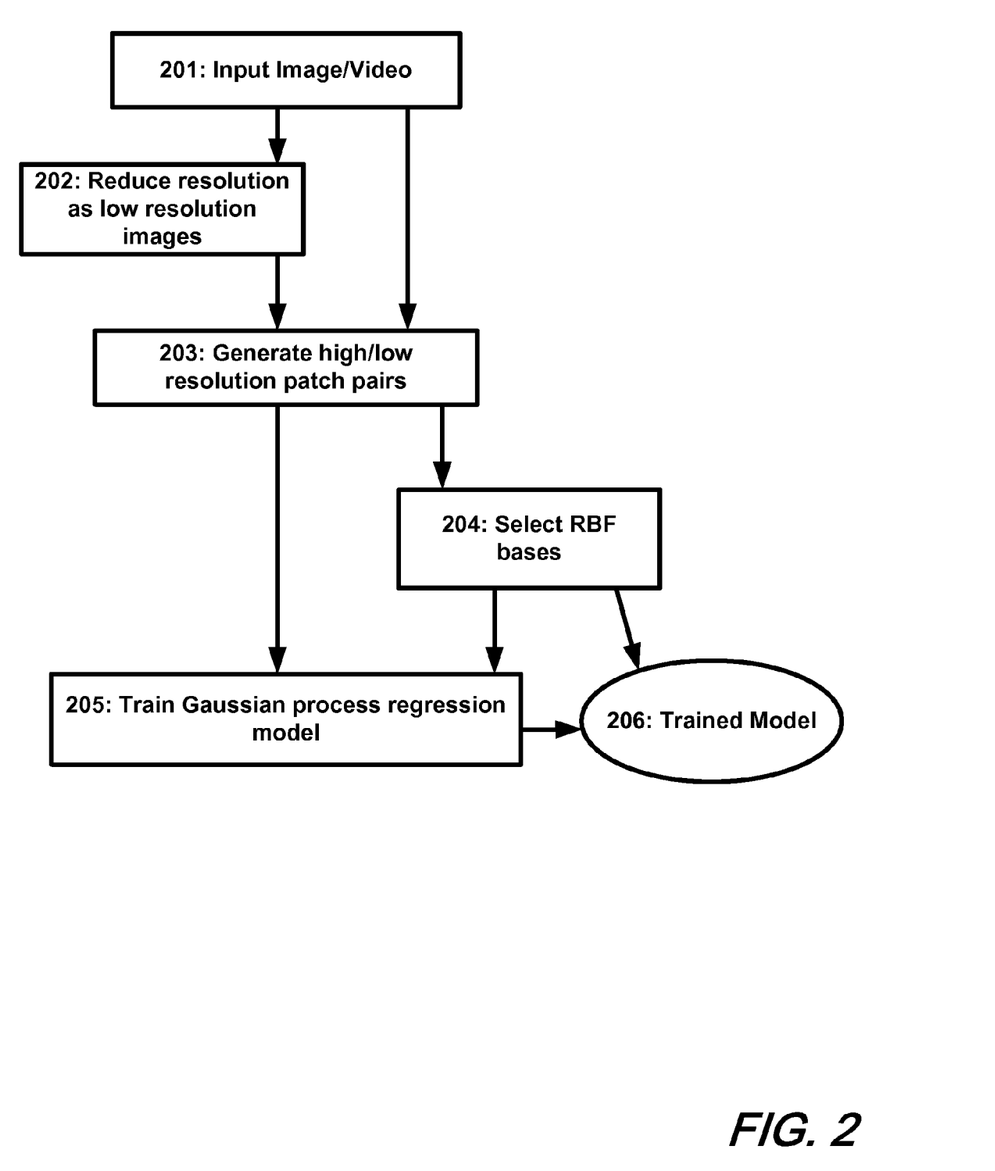
FIG. 2 is a flowchart showing the steps associated with producing a trained model used in the super resolution image production of FIG. 1.

FIG. 2 is a flowchart depicting the generation of the trained model used in our super resolution method shown in FIG. 1. With reference to FIG. 2, an image or series of images (video) is input (step 201). The resolution of the input image(s)/videos are reduced (step 202) and a set of high/low resolution patch pairs is generated (step 203). The Gaussian process regression model is trained (step 205) and one or more RBF bases (step 204) are selected to produce the trained model (step 206). This trained model is used in step 106 of FIG. 1.

EXPERIMENTS

Figure 3:
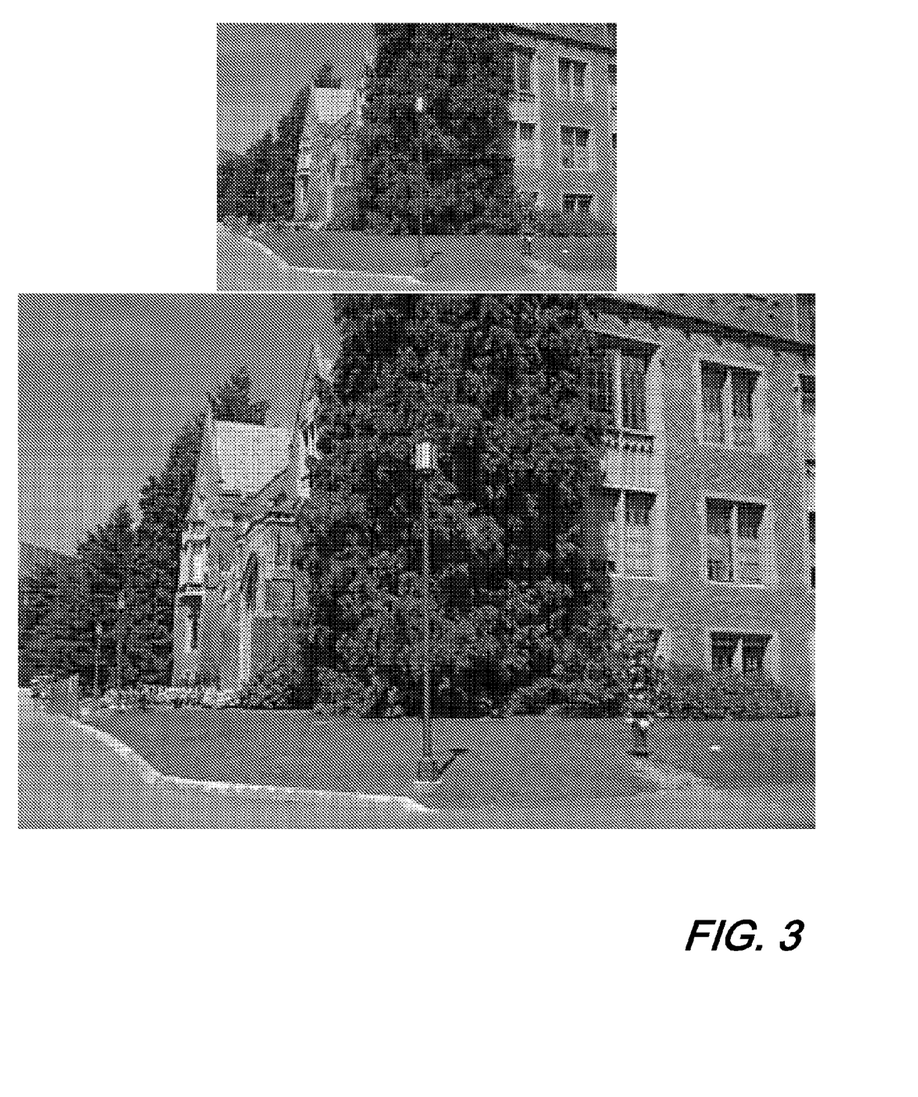
FIG. 3 is an exemplary image showing super resolution according to the present invention.
Figure 4:
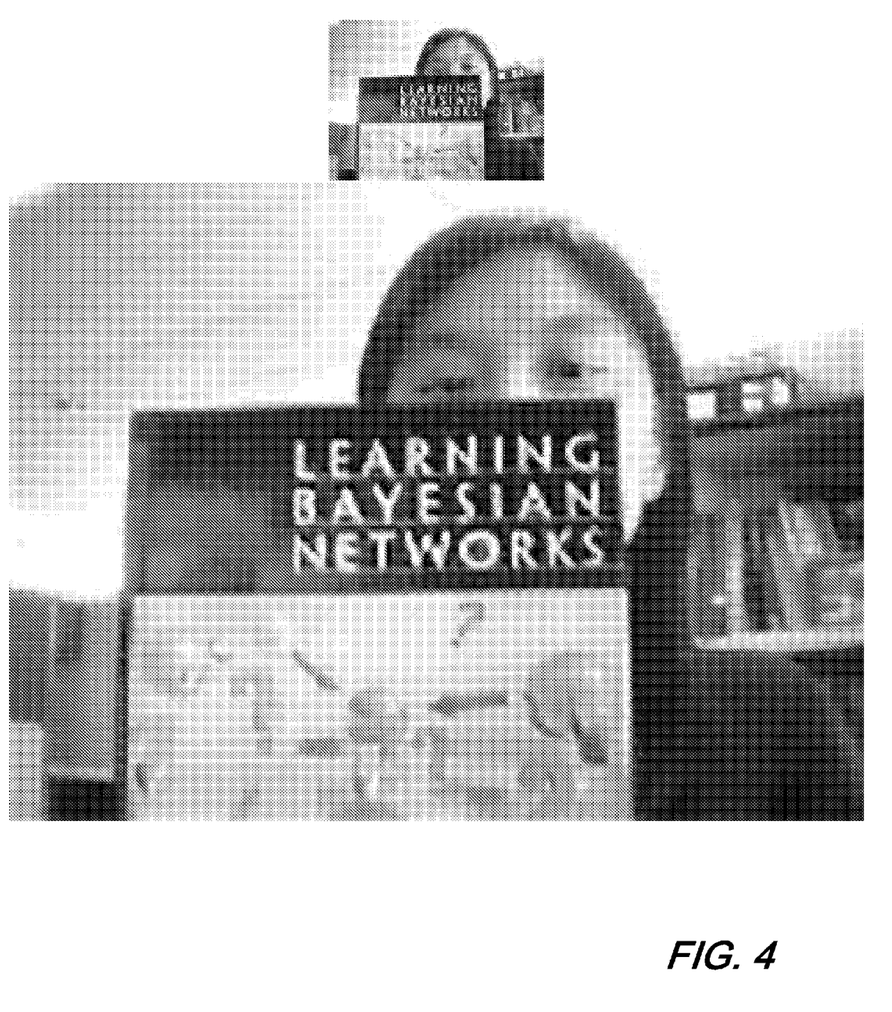
FIG. 4 is an exemplary image showing super resolution according to the present invention.
Figure 5:
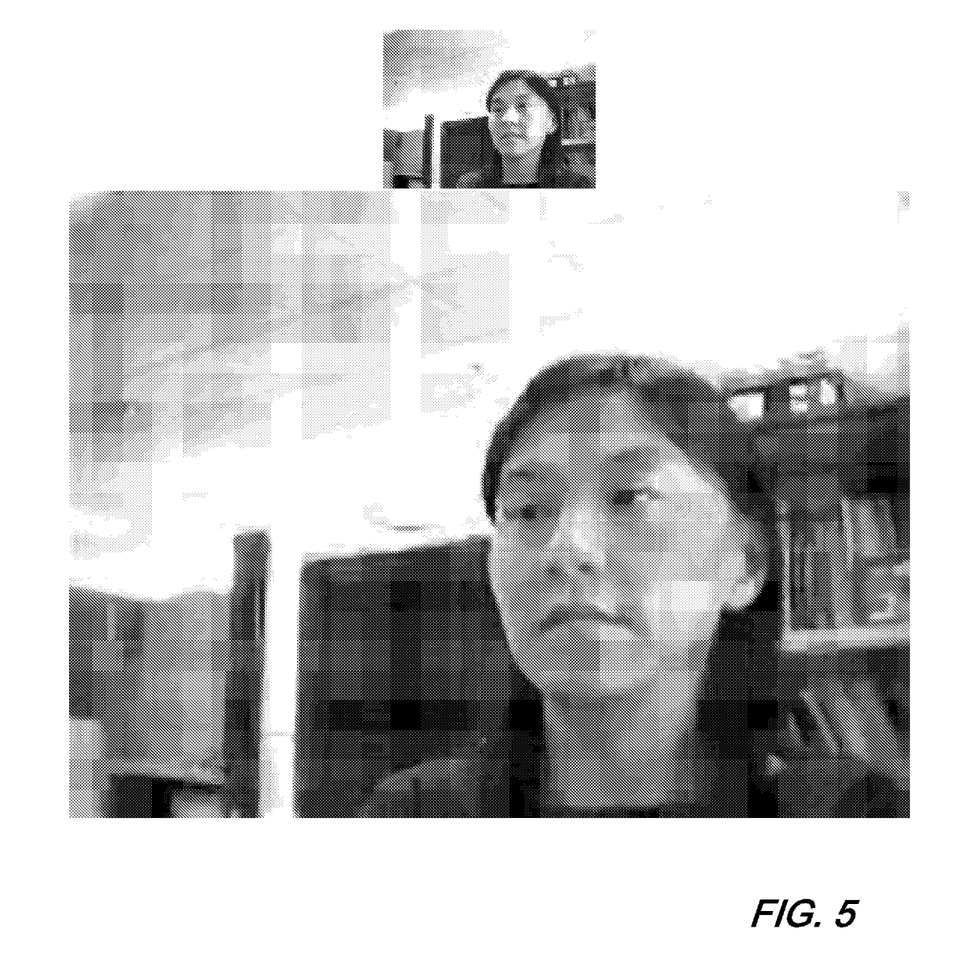
FIG. 5 is an exemplary image showing super resolution according to the present invention.
Figure 6:
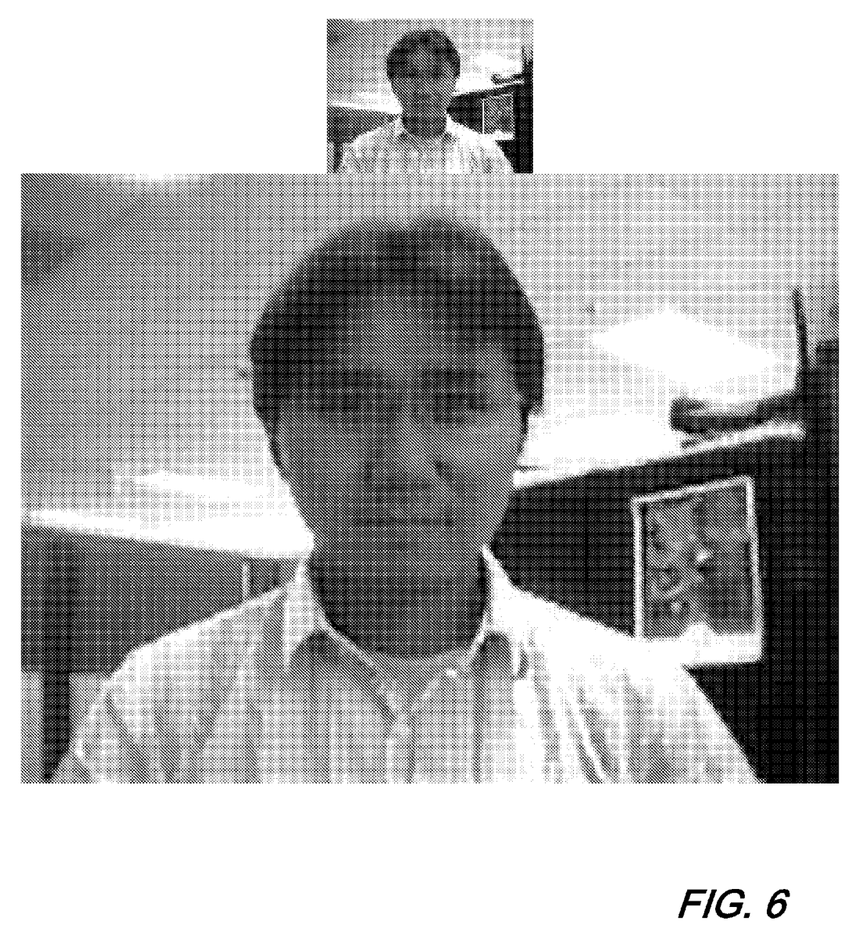
FIG. 6 is an exemplary image showing super resolution according to the present invention.
Figure 7:
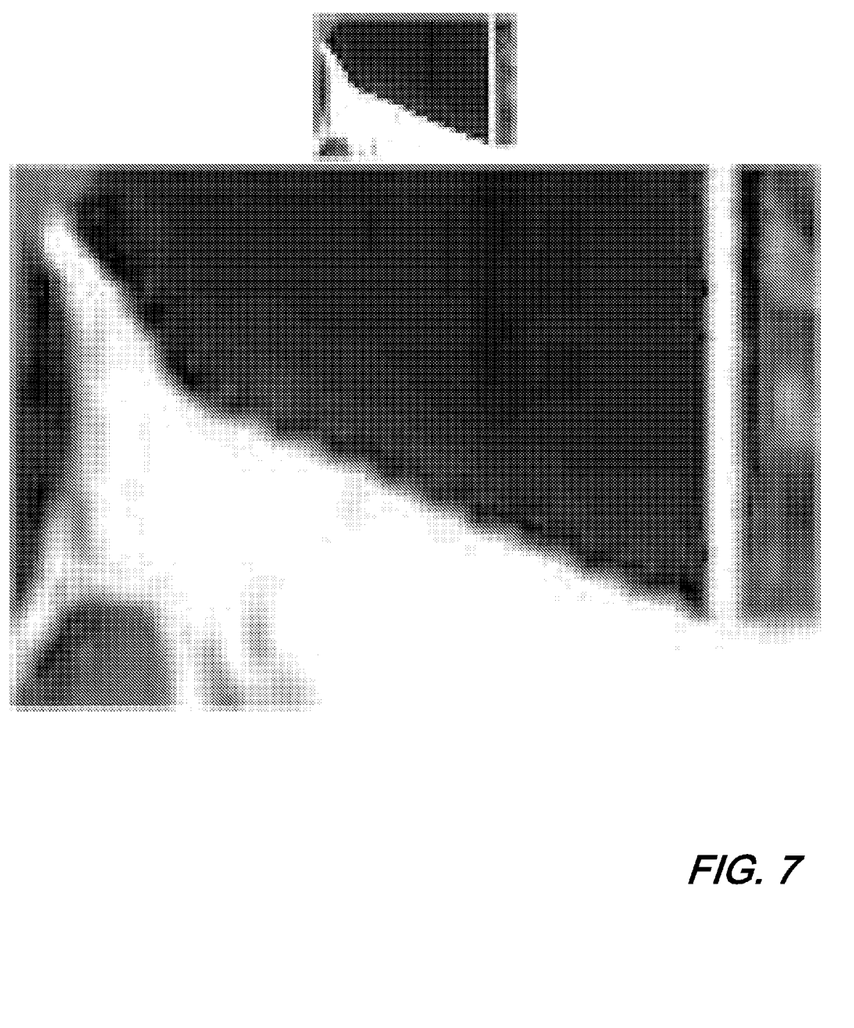
FIG. 7 shows details of the super resolution image of FIG. 5.

In the experiment of image super resolution, we did two-by-two time super resolution. This algorithm improved the mean square error by 10% comparing to the cubic interpolation algorithm. The input and output images are shown in FIG. 3. In the experiment, we use Creative WebCam Notebook to take the real time video input (160×120). The output is four-by-four time resolution of the input. We use DELL dual dual-core 2.8 GHz CPU to performance the super resolution. We can achieve about 10 fps. The input and output images are shown in FIG. 4, FIG. 5 and FIG. 6. A patch of FIG. 5 is shown in FIG. 7.

CONCLUSION

The method of sparse approximate Gaussian process regression speeds up the image super resolution process by thousand of times comparing to the original KD-tree approach. The method also reduces the MSE of produced image.

Accordingly, the invention should be only limited by the scope of the claims attached hereto.

The invention claimed is:

1. A computer-implemented method for generating a super-resolution image from a low resolution image, said method comprising the steps of:
   determining a set of non-smooth low resolution patches of the low resolution image;
   generating—using Gaussian process regression—a set of high-resolution patches for the low resolution image;
   combining the high-resolution patches; and
   generating a high-resolution image from the combined patches.

2. The computer-implemented method of claim 1 further comprising the step of
   transforming the low-resolution patches using selected bases of radial basis function kernels.

3. The computer-implemented method of claim 2 further comprising the step of:
   training a model on the low-resolution image thereby generating a trained model.

4. The computer-implemented method of claim 3 wherein said training step comprises the steps of:
   generating a lower resolution image from the low-resolution image.
   generating a set of high/low resolution patch pairs;
   selecting a set of RBF bases; and
   training a Gaussian process regression model thereby generating the trained model.

5. The computer-implemented method of claim 4 whereby the transforming step and the Gaussian process regression step(s) are performed simultaneously for a number of patches.

* * * * *